(12) United States Patent
Kiukkonen et al.

(10) Patent No.: US 7,610,031 B2
(45) Date of Patent: Oct. 27, 2009

(54) ERROR CORRECTION IN RECEIVER OF RADIO SYSTEM

(75) Inventors: Niko Kiukkonen, Veikkola (FI); Jari Junell, Vantaa (FI)

(73) Assignee: Nokia Corporation, Espoo (FI)

( * ) Notice: Subject to any disclaimer, the term of this patent is extended or adjusted under 35 U.S.C. 154(b) by 276 days.

(21) Appl. No.: 10/437,455

(22) Filed: May 14, 2003

(65) Prior Publication Data

US 2004/0019836 A1    Jan. 29, 2004

(30) Foreign Application Priority Data

May 17, 2002    (FI) .................................. 20020937

(51) Int. Cl.
*H04B 1/10* (2006.01)
(52) U.S. Cl. ........................ 455/296; 455/307; 455/311
(58) Field of Classification Search ................. 455/296, 455/307, 311
See application file for complete search history.

(56) References Cited

U.S. PATENT DOCUMENTS

| | | | |
|---|---|---|---|
| 363,098 A * | 5/1887 | Jones ...................... 254/131.5 |
| 4,873,646 A | 10/1989 | Stoops | |
| 5,218,621 A | 6/1993 | Cudak et al. | |
| 5,557,640 A * | 9/1996 | Chadwick .................... 375/229 |
| 5,768,317 A | 6/1998 | Fague et al. | |
| 5,896,306 A | 4/1999 | Aschwanden | |
| 6,542,202 B2 * | 4/2003 | Takeda et al. ................ 348/678 |
| 6,654,594 B1 * | 11/2003 | Hughes et al. ........... 455/245.1 |
| 6,741,838 B2 * | 5/2004 | Tsujimoto .................... 455/101 |
| 6,901,243 B2 * | 5/2005 | Jayaraman et al. ......... 455/63.1 |

FOREIGN PATENT DOCUMENTS

WO    WO 00/30260    5/2000

* cited by examiner

*Primary Examiner*—Nay A Maung
*Assistant Examiner*—Richard Chan
(74) *Attorney, Agent, or Firm*—Squire, Sanders & Dempsey, L.L.P.

(57) ABSTRACT

The invention relates to a receiver in a radio system that contains receiving means for receiving a signal, amplification means for amplifying the received signal with an amplification step, and means for limiting the frequency band of the amplified signal. The receiver also contains correction means for correcting the step response of the limiting means by using step response information defined in advance. The invention also relates to a method for correcting the step response.

24 Claims, 3 Drawing Sheets

ERROR CORRECTION IN RECEIVER OF RADIO SYSTEM

BACKGROUND OF THE INVENTION

1. Field of the Invention

The invention relates to a receiver in a radio system, and especially to error correction during signal reception.

2. Description of the Related Art

As the number of users of radio systems increases, radio systems need to be positioned close to each other in the frequency domain so as to be able to utilize the available frequencies as efficiently as possible. For the reception of signals, the closeness of the systems is disadvantageous, because the demands on signal filtering, A/D conversion, error correction and interference elimination increase. For instance in A/D conversion, an interference signal that is multifold in strength with respect to the signal to be detected can cause saturation in the A/D converter, which can be prevented by changing the amplification of the signal. FIG. 1 shows the spectrum of a signal received in a radio system, with the frequency on a horizontal axis and the magnitude spectrum in decibels on the vertical axis. The central frequency of the signal to be detected 100 is approximately 2 MHz, whereas the central frequency of the interference signal 102 that is multifold with respect to the signal to be detected is approximately 5 MHz. If the receiver was a narrowband receiver, the interference signal 102 could be filtered before amplification adjustment and A/D conversion. The received band is very broad in broadband receivers and if the received band contains interference components, their analog filtering is not possible. In a broadband receiver, the interference signal is separated from the desired signal after the A/D conversion.

FIG. 1 shows that the power level of the desired signal is very low, so, in practice, the signal should be amplified before the analog-to-digital conversion. FIG. 2 shows a signal spectrum after a +6-dB amplification step. The figure shows how the amplification step has degraded the signal spectrum to a broader frequency range, which is a result of the non-linear nature of the amplification change. Degrading the signal spectrum is harmful for the detection of the desired signal, because the desired signal can no longer be easily separated from the broad spectrum. In the same manner as the amplification change, filtering also causes the degradation of the signal spectrum. In a filter, the degradation of the spectrum is caused by the effect of the step response of the filter.

Reference publication EP 1,129,522 describes a known solution for correcting amplification. In known solutions, the effect of the step response of a filter is reduced by deleting a few samples around the amplification step and by replacing the deleted samples by interpolated samples. The steeper the filter, the more samples need to be interpolated in practice. It is clear that a very good performance in signal reception cannot be achieved with the interpolation of samples, if there are several interpolated samples one after the other.

SUMMARY OF THE INVENTION

It is an object of the invention to implement an improved method for correcting the amplification step and the step response of a filter, and an apparatus implementing the method. This is achieved by an error correction method in a receiver of a radio system, comprising: receiving a signal at the receiver of the radio system, changing the amplification of the received signal with an amplification step, and limiting the frequency band of the amplified signal. The method corrects a step response distortion caused by the limiting of the frequency band by using correction coefficients defined in advance.

The invention also relates to an arrangement for correcting an error caused by an amplification change in a radio system, comprising: means for receiving a signal, means for changing the amplification of the received signal with an amplification step, and means for limiting the frequency band of the amplified signal. The arrangement comprises means for correcting a step response distortion caused by the limiting means by means of correction coefficients defined in advance.

A few of the embodiments of the invention are disclosed in the dependent claims.

The invention relates to receivers of a radio system and can be implemented in both narrow and broadband receivers. Systems, to which the invention can be applied, include GSM (Global System for Mobile communication), EDGE (Enhanced Data rates for GSM Evolution) and UMTS (Universal Mobile Telecommunications System). By means of the invention, it is possible to correct in the receiver the distortion caused to a signal by a change in the signal amplification and by frequency band limitation. Frequency band limitation refers herein to for instance the filtering taking place between amplification and A/D conversion that does not limit the band of the received signal, but filters the noise outside the band. Thus, the signal energy contained in the band received by the receiver is let in to the A/D converter.

The solution of the invention defines the step response of the filter in advance and utilizes the step response information in signal correction. A step response refers herein to how the filter reacts to a sudden change in the power level of the signal. The step response can be defined when the magnitude of the change in the power level and the properties of the filter, such as the corner frequency and order, are known. The step response can be defined using a nominal filter by calculation or alternatively by analyzing each filter separately. The step response of a filter often relates to a change in the signal amplification made in the receiver. The step response can then be defined, because, in practice, the change in amplification in the receiver is of a standard magnitude. The invention is naturally not restricted to using amplification of a certain magnitude in the receiver, but the magnitude can vary and the step response of the filter can be defined for all used amplifications. The invention is also not limited to having only one filter between amplification and A/D conversion, but there may be several filters. A step response should then be defined for each used filter for each used amplification change.

Defining the step response of a filter means that the amplitude of a signal passing the filter is defined specifically for each sample. After defining the step response, correction coefficients are formed for correcting the effect of the step response after the A/D conversion. A sample-specific correction coefficient is formed as an inverse value of the sample value, for instance.

The receiver of the method comprises control means that monitor changes in amplification. On the basis of the change in amplification, the control unit selects the correction coefficients to be used and manages the timely input of the correction coefficients with respect to the digital signal. The correction coefficients are read from a separate look-up table, to which values are stored in advance. The correction coefficients can also be generated in real time during the processing of the signal. The correction of the signal values is done in a correction unit, in which amplification and one or more filters can be corrected separately or they can all be corrected at the same time. For instance, if there are two filters to be corrected in the receiver, these can be corrected separately, or the step response distortions of the filters can be corrected as one entity. Amplification correction can also be done by multiplying, or if the amplification step is selected suitably to be +/−6 dB, for instance, the change in amplification can be corrected by shifting, i.e. bit shifting.

The method and system of the invention provide significant improvements in the signal-to-interference ratio in comparison with known solutions.

BRIEF DESCRIPTION OF THE DRAWINGS

The invention will now be described in greater detail by means of embodiments and with reference to the attached drawings, in which.

DETAILED DESCRIPTION OF THE PREFERRED EMBODIMENTS

Figure 1:
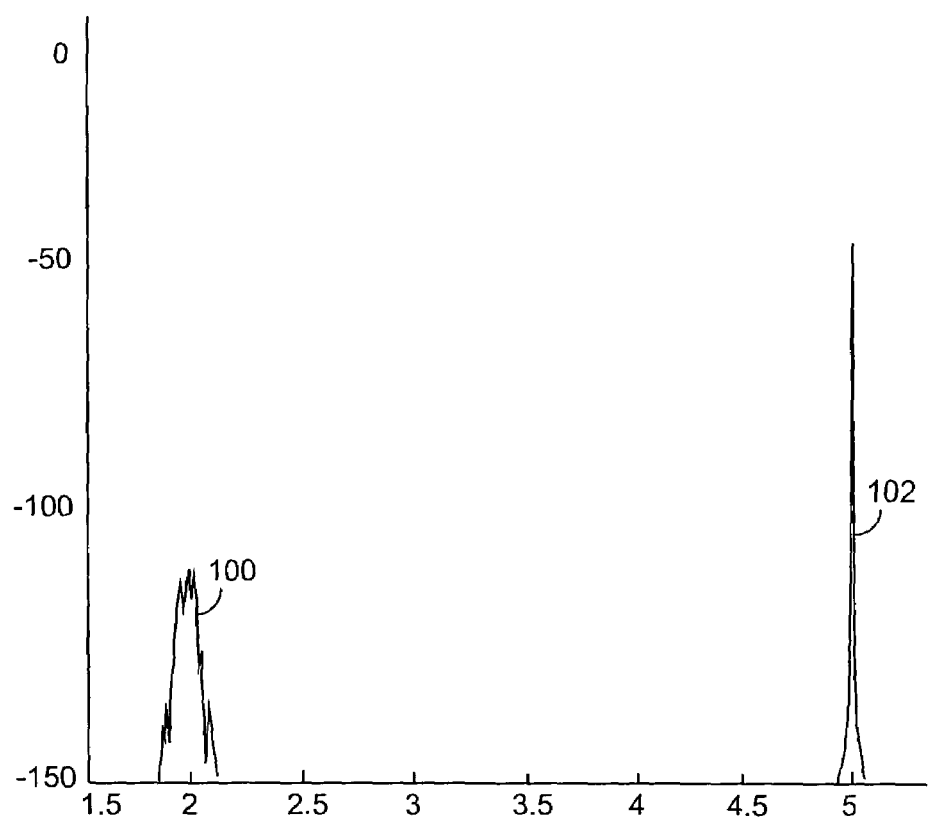
FIG. 1 shows the already described signal spectrum received in a radio system.
Figure 2:
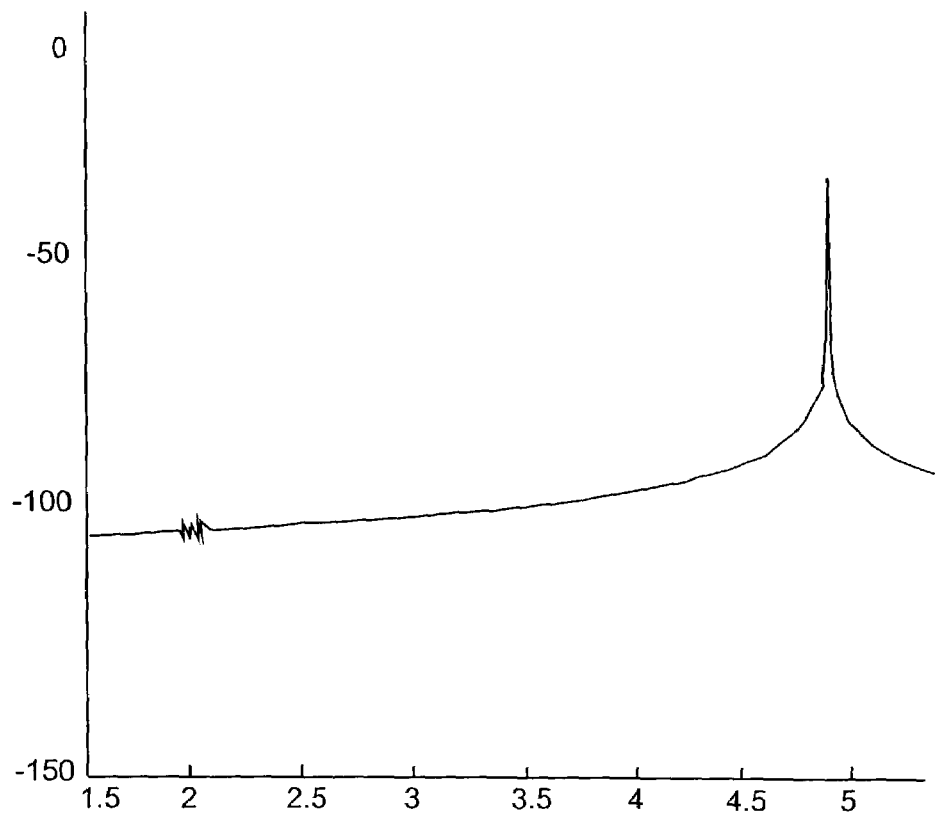
FIG. 2 shows the already described signal spectrum of FIG. 1 after the amplification step.
Figure 3:
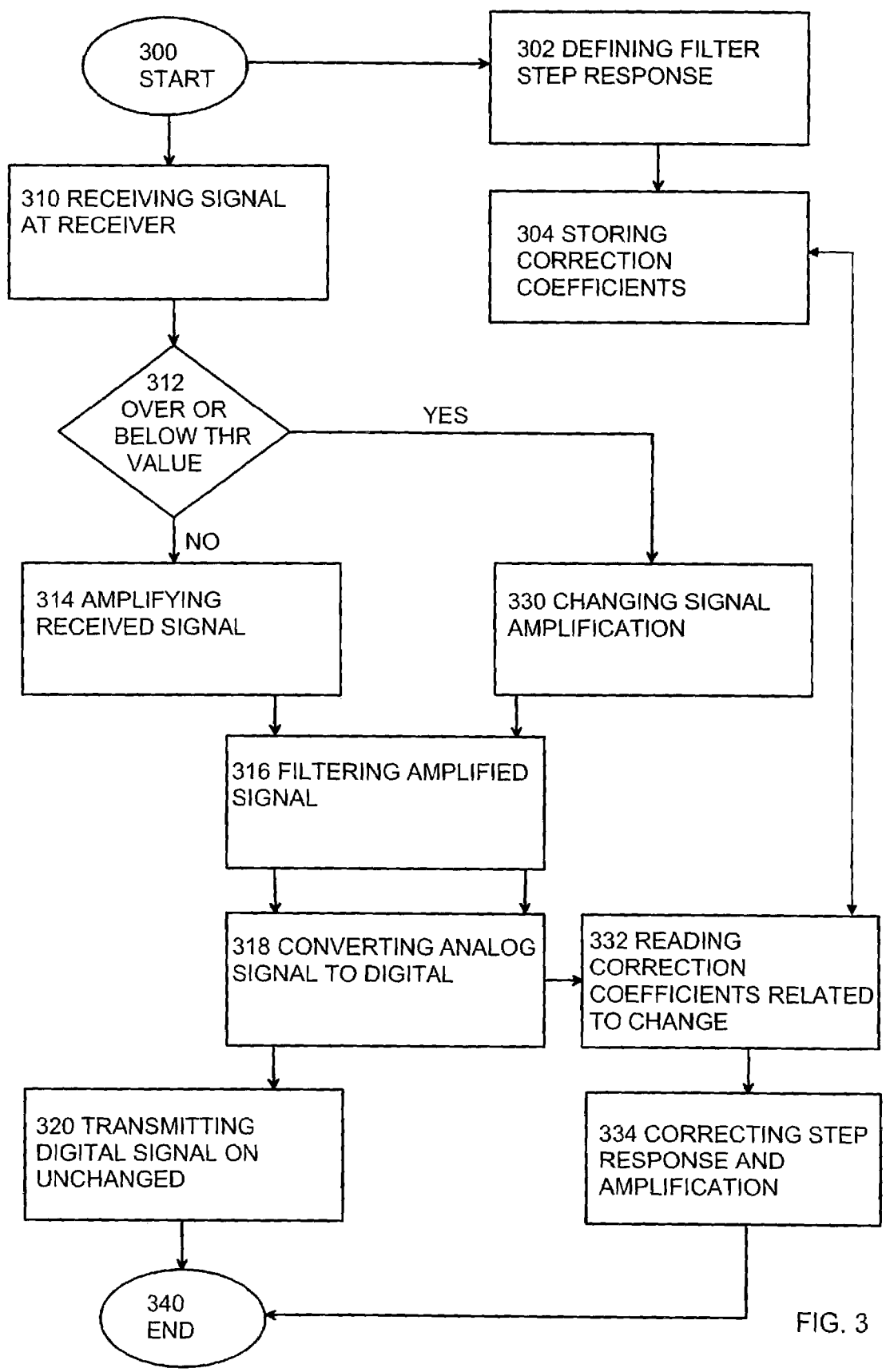
FIG. 3 shows an embodiment of the method.
Figure 4:
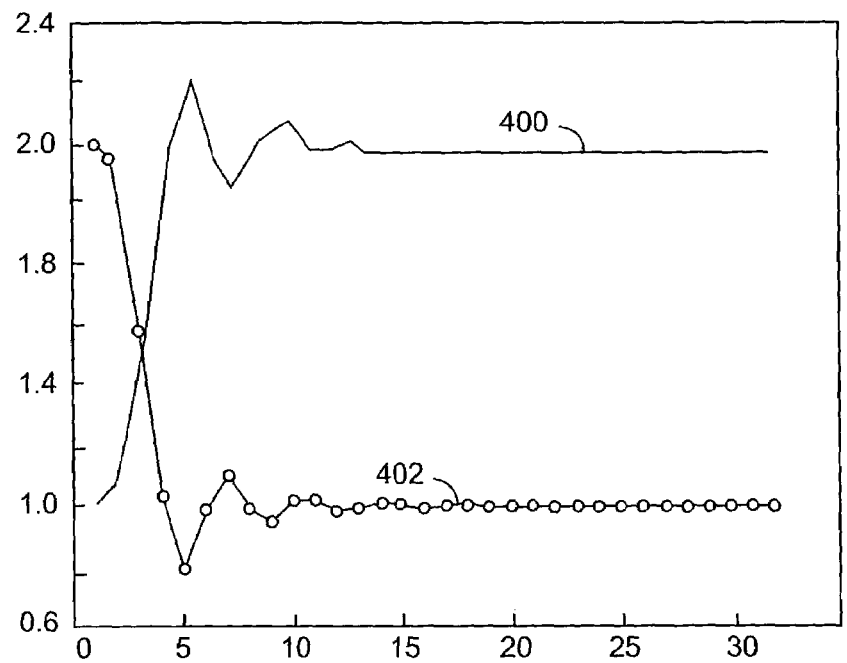
FIG. 4 shows the step response of a filter.

In the following, the invention will be described by means of a few embodiments. It is clear that the presented embodiments are only examples and the invention is not restricted to them. One embodiment of the method of the invention is shown in FIG. 3. The reception of a signal is described generally by means of method steps 310 to 320, and steps 302 to 304 and 330 to 334 are method steps specifying the invention. Method step 302 shows the definition of the step response of a filter. The step response can be defined for each filter separately by measuring prior to using the filter, or it can be defined by calculation on the basis of the properties of a nominal filter. FIG. 4 shows, as an example, the step responses of a fifth-order Butterworth low-pass filter: graph 400 shows the step response for a +6-dB amplification step and graph 402 shows the step response for a −6-dB amplification step. The X-axis of FIG. 4 shows the number of samples and the Y-axis shows the amplitude. The points corresponding to a sample index are shown on graph 402 for the sake of illustration. Graph 402 shows that amplification in fact drops only after approximately 10 sample cycles from the actual change of amplification, i.e. due to the step response of the filter, there is a delay in the amplification change, which the invention is intended to correct. FIG. 4 shows that the 7 first amplitude values of the −6-dB amplification step are approximately 2.000, 1.930, 1.590, 1.020, 0.810, 0.990, 1.200 and 0.990. Enough sample values are defined to correct the distortion caused by the step response at sufficient accuracy, which in practice means that 5 to 30 samples, for instance, are defined for the step response.

In method step 304, correction coefficients are formed for the step response. The correction coefficients are formed by taking the inverses of the sample values, that is, in the above 7-sample example, the first correction coefficient is $1/2.000$, i.e. 0.500, the second correction coefficient is $1/1.930$, i.e. 0.518, and the third correction coefficient is $1/1.590$, i.e. 0.629. This is continued until all samples of the step response have their correction coefficients. The correction coefficients can be stored, as shown in step 304, in a look-up table in the receiver, from which the correction coefficient corresponding to a specific sample index can easily be found. Separate look-up tables can be reserved for both amplification directions, i.e. for +6-dB amplification change and −6-dB amplification change, but the values can also be entered in the same look-up table. Alternatively, the correction coefficients in the other direction can be calculated when the coefficients of the other step are known. For instance, the correction coefficients of the +6-dB amplification step are obtained as the inverse values of the −6-dB step.

In the initial step 310 of the method, a signal is received in the receiver of the radio system. The used receiver can be a narrowband or broadband receiver. Broadband means that the system is capable of supporting transmission rates that are higher than the principal transmission rate. A broadband receiver thus differs from for instance a GSM receiver that operates in the frequency range of approximately 900 MHz and in which each user is allocated a time-slot on a specific 200-kHz frequency band. Interference signals can be efficiently filtered in a narrowband receiver, but the band received by a broadband receiver is so broad that strong interference signals may also be received.

However, the solution of the invention can be applied to both narrowband and broadband radio systems. The only essential thing is that filtering is done between the amplification change and A/D conversion. A broadband receiver means herein a receiver whose analog bandwidth is broader than the bandwidth of a single signal of the receiving system. The invention can be implemented in a base station or terminal of a radio system, such as a mobile system.

In method step 312, the power level of the received signal is checked. If the power level exceeds a specific threshold value, the amplification of the signal is made lower. Correspondingly, if the power level is lower than a low threshold value, the amplification of the signal is made higher. If in step 312, it is noted that no changes are needed to the amplification of the signal, the routine moves to step 314.

In method step 314, the received signal is amplified using the amplification used earlier, i.e. no changes were made in the amplification on the basis of step 312. The factor directing the magnitude and direction of amplification is the operating range of the analog-to-digital converter, i.e. the maximum values of the received signal are preferably close to the maximum of the operating range of the A/D converter. So as to make the signal levels comparable between different time instants, the effect of the amplification step can be corrected after the A/D conversion with an inverse amplification step. If the amplification step is for instance +6 dB, the amplification is corrected after the A/D conversion with a −6-dB inverse amplification step. One embodiment uses as the magnitude of amplification a +/−6-dB amplification step that provides double amplification and can be corrected with a one-bit shift after the A/D conversion. Amplification can be improved using multiples of the amplification step. A change of +24 dB in amplitude, for instance, can be achieved by performing four +6-dB amplitude steps consecutively. Amplification control is done in the receiver by using AGC (Automatic Gain Control), for instance, by means of which the receiver can quickly change amplification according to the variations in the power level of the input signal. It is clear that step 314 is optional in the reception of the signal, because if the signal is already of the desired strength at reception, amplification is not necessary.

Method step 316 filters the signal amplified in step 314. Filtering refers herein to a low-pass filter whose passband extends from zero frequency to the cut-off frequency of the filter.

Method step 318 converts the analog signal to digital format. In analog-to-digital, i.e. A/D, conversion, the information in the signal remains essentially the same, only its presentation changes. In A/D conversion, samples are taken from the analog signal and placed on a digital level best corresponding to the analog sample.

In method step 320, it is assumed that no changes occurred in amplification, so the signal received from A/D conversion is taken for further processing. There is no need to correct the signal for the part of the step response of the filter, which can be implemented as multiplication by one, whereby each digital sample remains the same. After amplification and the correction of the error caused by filtering, the further processing of the signal begins typically by detection of user signals and elimination of multi-use interference.

Method step 330 shows a situation, in which it is necessary to change the amplification of the signal in the receiver. The change in amplification is for instance +/−6 dB or a multiple of this, such as +/−12 dB, which means a fourfold change in amplification. It is clear that the magnitude of the change in amplification is not bound to the multiples of two, but can also be some other number. The correction of the change in amplification is then done in the receiver by means of multiplication instead of bit shifting. In other words, if the change in amplification is for instance 1.5 fold, the correction of the change in amplification is done by multiplying the signal by the inverse of 1.5, which is approximately 0.667. After the change in amplification, method steps 316 and 318 are performed for the signal, i.e. the signal is filtered and converted into digital format.

In the receiver, information on amplification correction is transmitted to a control unit that, in step 332, reads the correction coefficients required for the correction of the filter step response from the look-up table that was formed and stored in the receiver in steps 302 and 304. Alternatively, the correction coefficients can be formed in real time by calculation. The control unit also controls that the correction coefficients are synchronized simultaneously with respect to the signal samples.

In step 334, amplification and the step response of one or more filters are corrected. The correction is done in a separate correction unit, for instance, to which the signal sample and the correction coefficient corresponding to the sample are read in a timely manner. The correction unit can be a two-stage unit, in which amplification is first corrected and then the step response of the filter. The step response and amplification can also be corrected in the opposite order. Or both operations can be combined in one block.

For method steps 332 to 334, it should be noted that signal amplification could change in the middle of amplification correction. Let us assume, for example, that a first −6-dB amplification step has been performed in the receiver. Graph 402 depicts the step response of the amplification step in FIG. 4. Let us assume that the correction unit has last corrected sample 2 having a step response of 1.930 and a corresponding correction coefficient of 0.518. If between samples 2 and 3, a new −6-dB amplification step is performed in the receiver, correction is continued from the beginning of the step response profile. This means that the correction coefficient $1/2.000$, i.e. 0.500, of the first sample is next used again, and after it, the correction coefficient $1/1.930$, i.e. 0.518, of the second sample, and so on. It should thus be noted in amplification correction that if two −6-dB amplification steps have been performed, amplification correction also needs to be changed, i.e. two bits are then shifted instead of one. In the following, the principles of a mobile system are examined in essential parts and hardware solutions of the preferred embodiments are described after that. In mobile systems, information is transmitted between a mobile network and mobile station by means of data transmission resources. The data transmission resources of a mobile network are defined in different ways depending on the multiple access method of the system. In the frequency division multiple access (FDMA) method, users are separated from each other by the frequency. In radio networks employing the time division multiple access (TDMA) method, several users can communicate on the same frequency band and the users are separated from each other by time by dividing the information transmitted or received by users into time-slots. In a radio system employing the code division multiple access (CDMA) method, several transmitting and receiving stations communicate on the same frequency band of the radio spectrum simultaneously. For the time of the connection, each user is allocated a spreading code for use to spread the information in the baseband signal. The recipient of the signal can identify the information transmitted by the user by despreading it with a corresponding spreading code. A radio system can also be implemented by combining multiple access methods; for example in a hybrid system based on the TDMA and CDMA methods, users communicating in each time-slot are separated from each other by the spreading codes.

None of the above multiple access methods guarantee an ideal and interference-free radio link between the users and mobile network. For instance, in a TDMA system, users communicating in adjacent time-slots and adjacent mobile system cells cause interference to each other. A drawback with the CDMA system is that users operating on the same frequency band cause interference to each other's transmissions due to the non-orthogonality of the spreading codes and the lack of synchronization between the transmitters. In addition to the interference caused by the users to each other, the contours of the surrounding terrain also cause interference to the transmission of information on the radio path. Multipath propagation refers to the fact that, as it propagates, a user signal reflects from various objects producing to the receiver several components of the same signal that are delayed in different ways. Multipath components of a signal can for instance cause fading in a situation, in which the signal is reflected from two closely situated objects. If the fading is significant, the signal cannot be received at all. Another radio system operating on a close or even the same frequency band may also cause interference to the radio transmission, which is a result of the increase in user numbers and the consequent ever increasing utilization of the frequency ranges. An example of such a solution is the positioning of the second- and third-generation mobile networks on the same frequency band.

Positioning mobile networks on the same frequency band often means that the desired signal is received in an environment full of interference. In a WCDMA radio system, for instance, a RAKE receiver based on reception through one or more antennas is used in the base station. A RAKE-type receiver can utilize multipath propagation in such a manner that several components delayed in various ways are received and combined to achieve the best user signal identification. A RAKE receiver is made up of correlators that are called branches or fingers. Each finger correlates one multipath component to produce a signal component corresponding to the component in question. Finally, the signal components produced from the different fingers are combined as a user signal. For RAKE reception, a delay profile, i.e. impulse response, is typically formed for the radio channel. The impulse response can be formed by means of a matched filter (MF), for instance. A matched filter is used on information received on a pilot channel or in the pilot sequence of a radio burst, for instance. Pilot symbols are a group of symbols known to the recipient and sender, whereby the recipient of the information can evaluate the quality of the used radio channel, since s/he knows what the received information should have contained. The matched filter calculates the convolution with the received signal and the user code one half of a spreading code chip at a time, for instance, and measures the reception power. This way, it is possible to form an impulse response pattern for the multipath components of the received user signal and the pattern contains information on the signal power and delays of the multipath components. The strongest multipath components are allocated to the RAKE fingers.

Figure 5:
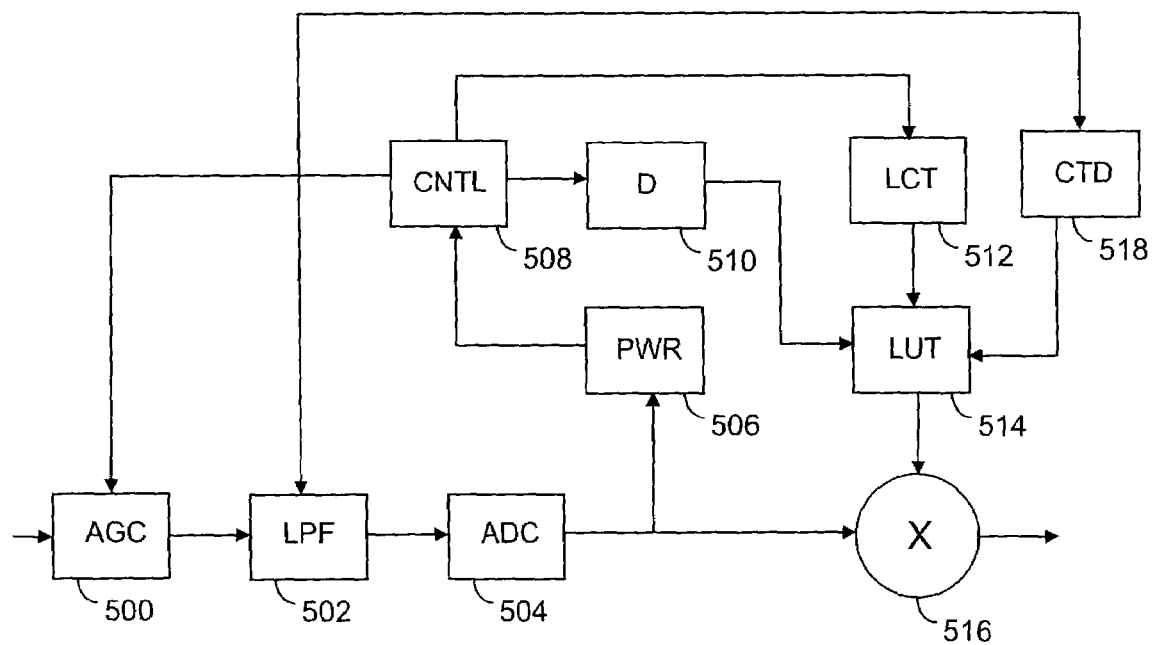
FIG. 5 shows an embodiment of the apparatus.

FIG. 5 describes the invention by means of one embodiment of the receiver. An analog signal is received at amplification means 500 of the receiver implemented by the AGC (Automatic Gain Control) principle, for instance. The amplification means 500 try to optimize the strength of the signal relative to the conversion range of an A/D converter 504. The amplification means amplify the signal in amplification steps, the magnitude of which varies according to the implementation and needs of the receiver. After amplification, the signal is filtered in a filter 502 prior to the A/D conversion. The purpose of the filtering is to filter noise and interference that are outside the received band. In the case of a narrowband GSM/900 signal, for instance, the received band is 200 kHz, but can in a broadband receiver be 35 MHz, for instance, and contain several GSM/900 channels. It is clear that between the AGC and ADC blocks, it is also possible to perform several other functions in the receiver than shown in FIG. 5, but their description herein is not essential. The analog signal is converted to digital format in the analog-to-digital converter 504. Power measuring means 506 define the power level of the digital signal and transmit it to a control unit 508 that, in turn, controls AGC amplification by feedback. The control unit compares the power level of the digital signal with a preset threshold value. If the threshold value is exceeded, it is reacted to quickly so that the amplification of the amplification means 500 of the block can be lowered before the A/D converter 504 starts to cut the signal.

The control unit 508 thus has information on the amplification used in the amplification unit and the changes in amplification. On the basis of the changes in amplification, the control unit transmits to a delay unit 510 information on how the amplification correction and signal samples should be timed with respect to each other. The control unit 508 transmits information on the amplification changes to control means 512 of look-up tables that read the correct correction coefficients on the basis of the amplification changes from lookup table 514. Thus, information on the correction functions to be used together with the A/D-converted signal is directed in a timely manner to correction means 516. The correction means can contain merely amplification correction, merely correction of the filter step response or both and the correction information on amplification and the step response. The receiver also comprises defining means 518 that define in advance the correction terms used in correction either by calculation by means of a nominal filter or by measuring the step response of the filter 502. It is clear that the defining means 518 can also be separate from the receiver, for example filter measuring equipment. The only essential thing for the receiver is that the results of the defining means 518 of the correction terms, i.e. the correction terms, are available to the receiver.

The invention can be implemented in the receiver by program, as ASIC (application-specific integrated circuit), DSP (digital signal processing), with separate logic components or in some other corresponding manner.

Even though the invention has been explained in the above with reference to examples in accordance with the accompanying drawings, it is apparent that the invention is not restricted to them but can be modified in many ways within the scope of the inventive idea disclosed in the attached claims.

The invention claimed is:

1. A method, comprising:
   receiving a signal at a receiver;
   defining correction coefficients based at least partly on a step response of a filter that is used to filter the received signal;
   changing the amplification value used in the receiver to amplify the received signal by increasing or decreasing the amplification value by an amplification step prior to filtering the received signal;
   filtering the amplified signal; and
   correcting a step response distortion caused by the filtering operation and correcting the amplification step when the amplification of the received signal is changed by increasing or decreasing the amplification value by the amplification step, wherein said correcting the step response and the amplification step are performed using the correction coefficients defined in advance.

2. The method as claimed in claim 1, further comprising:
   converting the received signal that is limited in its frequency band by filtering the received signal into digital samples in an analog-to-digital conversion; and
   correcting the step response distortion with sample-specific correction coefficients in the digital samples obtained from the analog-to-digital conversion.

3. The method as claimed in claim 1, wherein sample-specific amplitude values of the step response obtained for the amplification step are defined in advance and the correction coefficients are inverse values of the sample-specific amplitude values.

4. The method as claimed in claim 3, wherein in the advance definition, the sample-specific amplitude values are defined by calculation using the step response of the at least one filter and the amplification step.

5. The method as claimed in claim 3, wherein in the advance definition, the sample-specific amplitude values are defined by measuring the step response of the at least one filter to the amplification step.

6. The method as claimed in claim 2, further comprising:
   correcting the amplification step after an analog-to-digital conversion with an inverse amplification step with respect to the amplification step.

7. The method as claimed in claim 6, further comprising:
   correcting the amplification step in connection with the correction of the step response distortion.

8. The method as claimed in claim 6, further comprising:
   correcting the amplification step prior to the correction of the step response distortion.

9. The method as claimed in claim 6, further comprising:
   correcting the step response distortion prior to the correction of the amplification step.

10. The method as claimed in claim 6, wherein the number of correction coefficients depends on the length of the step response and the number of amplification steps.

11. The method as claimed in claim 6, further comprising:
    using amplification of +6 dB or −6 dB as the amplification step; and
    correcting the amplification change by shifting the digital samples one bit down or up during the time of the amplification change.

12. An apparatus, comprising:
a definer configured to define correction coefficients, based at least partly on a step response of a filter used to filter a received signal; and
a processor configured to change the amplification value used to amplify the received signal by increasing or decreasing the amplification value by an amplification step prior to filtering the received signal, wherein the processor is further configured to filter the amplified signal, and correct a step response distortion caused by the filtering operation and correcting the amplification step when the amplification of the received signal is changed by increasing or decreasing the amplification value by the amplification step, wherein said correcting the step response and the amplification step are performed using the correction coefficients defined in advance.

13. The apparatus of claim 12, wherein
the processor is further configured to correct the step response distortion with sample-specific correction coefficients in digital samples obtained from an analog-to-digital conversion.

14. The apparatus of claim 12, wherein the apparatus is further configured to define in advance sample-specific amplitude values of the step response of the at least one filter obtained for the amplification step.

15. The apparatus of claim 14, wherein the apparatus is configured to form the correction coefficients as inverse values of the sample-specific amplitude values.

16. The apparatus of claim 14, wherein the apparatus is configured to form the sample-specific amplitude values by calculation using nominal filtering.

17. The apparatus of claim 14, wherein the apparatus is configured to measure the sample-specific amplitude values of the step response of the at least one filter and the amplification step.

18. The apparatus of claim 13, wherein the processor is configured to correct the amplification step in the digital samples obtained from the analog-to-digital conversion by an inverse amplification step.

19. The apparatus of claim 18, wherein the processor is configured to correct the amplification step in connection with the correction of the step response distortion caused by the filtering.

20. The apparatus of claim 18, wherein the processor is configured to correct the amplification step prior to correcting the step response distortion.

21. The apparatus of claim 18, wherein the processor is configured to correct the step response distortion prior to correcting the amplification step.

22. The apparatus of claim 18, wherein the number of correction coefficients depends on the length of the filtering step response and the number of amplification steps.

23. The apparatus of claim 18,
wherein the processor is configured to correct amplification with an inverse amplification step with respect to the amplification step and to implement the correction by shifting digital samples one bit down or up during the amplification change, wherein the amplification step may be +6 dB or −6 dB.

24. An apparatus, comprising:
receiving means for receiving a signal;
defining means for defining correction coefficients based at least partly on a step response of a filter that is used to filter the received signal;
amplification means for changing the amplification value used in the receiver to amplify the received signal by increasing or decreasing the amplification value by an amplification step prior to filtering the received signal;
filtering means for filtering the received signal;
correction means for correcting the step response distortion caused by the filtering operation and correcting the amplification step when the amplification of the received signal is changed by increasing or decreasing the amplification value by the amplification step, wherein said correcting the step response and the amplification step are performed using the correction coefficients defined in advance.

* * * * *